(12) United States Patent
Ranjan et al.

(10) Patent No.: US 9,794,113 B2
(45) Date of Patent: Oct. 17, 2017

(54) NETWORK ALERT PATTERN MINING

(71) Applicant: Cisco Technology, Inc., San Jose, CA (US)

(72) Inventors: Rajeev Ranjan, Bangalore (IN); Manoj Kumar Kushwaha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 14/172,110

(22) Filed: Feb. 4, 2014

(65) Prior Publication Data
US 2015/0222477 A1    Aug. 6, 2015

(51) Int. Cl.
*G06F 15/173*    (2006.01)
*H04L 12/24*     (2006.01)

(52) U.S. Cl.
CPC ...... *H04L 41/0613* (2013.01); *H04L 41/0631* (2013.01)

(58) Field of Classification Search
CPC ............. H04L 41/0613; H04L 41/0627; H04L 41/064; H04L 41/0631
USPC ........................ 709/223, 224, 225, 220, 230
See application file for complete search history.

(56) References Cited

U.S. PATENT DOCUMENTS

| 7,043,661 | B2 * | 5/2006 | Valadarsky ......... H04L 41/0604 |
| | | | 379/15.05 |
| 7,197,546 | B1 * | 3/2007 | Bagga ................. H04L 41/0856 |
| | | | 370/469 |
| 7,899,783 | B1 | 3/2011 | Xu et al. |
| 8,643,485 | B2 * | 2/2014 | Sheleheda ............ G08B 25/001 |
| | | | 340/506 |
| 2004/0133672 | A1 | 7/2004 | Bhattacharya et al. |
| 2005/0204162 | A1 | 9/2005 | Rayes et al. |
| 2005/0251860 | A1 * | 11/2005 | Saurabh .............. H04L 63/1416 |
| | | | 726/23 |
| 2006/0239200 | A1 | 10/2006 | Pirzada et al. |
| 2010/0159977 | A1 | 6/2010 | Shaffer et al. |

* cited by examiner

*Primary Examiner* — Normin Abedin
(74) *Attorney, Agent, or Firm* — Parker Ibrahim & Berg LLC; James M. Behmke; Stephen D. LeBarron

(57) ABSTRACT

In one embodiment, a device receives a plurality of network alerts over a time frame. A sliding transaction window is used across the time frame to associate each network alert occurring within the transaction window with one or more transactions. A pruning test is applied to subsets of the plurality of network alerts, with the network alerts in a given subset being associated with the same transaction. The pruning test is based in part on the number of co-occurrences of network alerts in a given subset for different transaction windows. The subsets of network alerts are assigned to network alert clusters based on the applied pruning test. The network alerts are then joined within a network alert cluster to identify the largest grouping of network alerts that pass the pruning test. A notification that the identified grouping of network alerts is associated with the same transaction is also provided.

9 Claims, 8 Drawing Sheets

| ALERT TYPE 302 | ALERT ID 304 | DEVICE 306 | ALERT 308 | TIMESTAMP 310 | ACTIVE? 312 |
|---|---|---|---|---|---|
| INFORMATIONAL | 0000053C | VE-CMBE-612 | AUTHENTIFICATION FAILED | 7/31/12 0:03 | ACTIVE |
| CRITICAL | 0000053D | 10.64.91.65 | HIGH COLLISION RATE | 7/31/12 0:04 | ACTIVE |
| CRITICAL | 0000053E | 10.64.91.65 | HIGH COLLISION RATE | 7/31/12 0:08 | CLEARED |
| ... | ... | ... | ... | ... | ... |

FIG. 3A

NETWORK ALERT PATTERN MINING

TECHNICAL FIELD

The present disclosure relates generally to computer network alerts, and, more particularly, to identifying network alert patterns.

BACKGROUND

In today's world, a network deployment may include thousands of network devices, such as routers, switches, and other networking devices. Each device in such a network may generate alerts regarding the status of the device (e.g., network alerts, etc.), resulting in a large amount of alerts generated by the network. A network manager may attempt to analyze each and every alert, to determine the root cause of network alerts and diagnose network problems.

The relationships between network devices can cause network alerts to be interrelated. In other words, a change in the behavior of one network device may affect the behavior of any number of other devices in the network. For example, failure of one network device can affect the functioning of other network devices, thus producing alerts across the set of affected devices. In many cases, however, the root cause of a set of alerts (e.g., failure of a single network device) may not be readily apparent upon initial inspection of the alerts. One of the main challenges in administering a network of devices, therefore, is to rapidly determine the root cause of a set of related alerts, so that corrective measures can be taken.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3A illustrates an example set of network alerts;

DESCRIPTION OF EXAMPLE EMBODIMENTS

Overview

Figure 1:
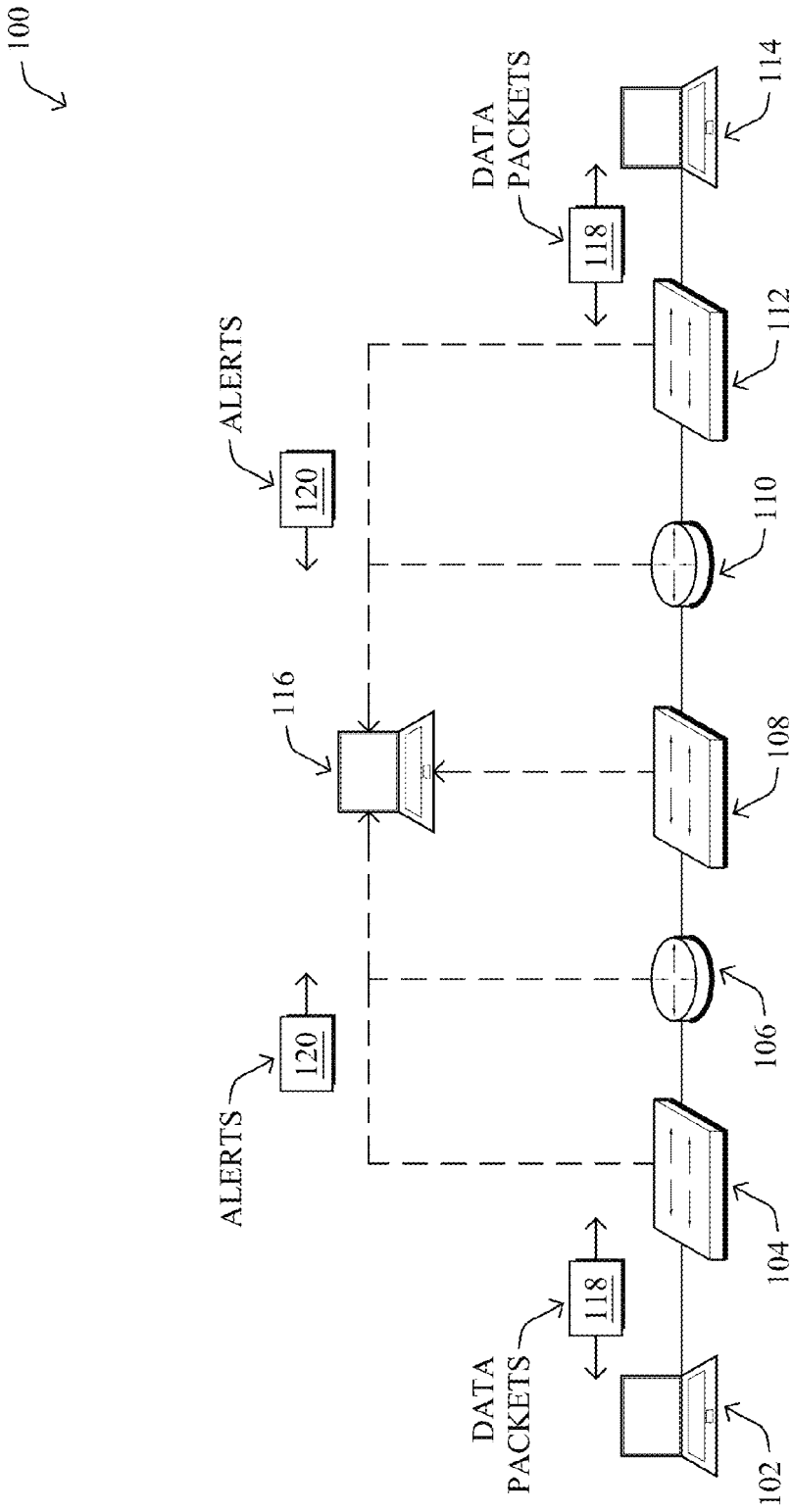
FIG. 1 illustrates an example communication network.

According to one or more embodiments of the disclosure, a plurality of network alerts is received at a device over a time frame. A sliding transaction window is used across the time frame to associate each network alert occurring within the transaction window with one or more transactions. A pruning test is applied to subsets of the plurality of network alerts, with the network alerts in a given subset being associated with the same transaction. The pruning test is based in part on the number of co-occurrences of network alerts in a given subset for different transaction windows. The subsets of network alerts are assigned to network alert clusters based on the applied pruning test. The network alerts are then joined within a network alert cluster to identify the largest grouping of network alerts that pass the pruning test. A notification that the identified grouping of network alerts is associated with the same transaction is also provided.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising a plurality of network devices interconnected by various methods of communication. For example, the links between network devices may be wired links or shared media (e.g., wireless links, PLC links, etc.). As shown, for example, computer network 100 may include network routers (e.g., network routers 106, 110) and switches (e.g., switches 104, 108, 112) that communicatively couple a first computing device 102 to a second computing device 114. Those skilled in the art will understand that any number of nodes, devices, links, etc. may be used in the computer network, and that the view shown herein is for simplicity. Also, those skilled in the art will further understand that while the network is shown in a certain orientation, particularly with a single communication path between computing devices 102 and 114, the network 100 is merely an example illustration that is not meant to limit the disclosure.

Data packets 118 (e.g., traffic and/or messages sent between the devices/nodes) may be exchanged among the nodes/devices of the computer network 100 using predefined network communication protocols such as certain known wired protocols (e.g., TCP/IP, etc.), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

According to various embodiments, computer network 100 includes a network monitoring device 116 that receives network alerts 120 from the various devices/nodes in computing network 100. Network alerts 120 include information regarding the operational state of some or all of the networking devices in network 100, such as fault alarms, informational status alerts, and the like. A variety of techniques may be employed for the reception of network alerts 120 by network monitoring device 116 such as publish-subscribe techniques, polling/query techniques, push or pull techniques, etc. In various cases, network monitoring device 116 may be a separate computing device in network 100, may be integrated into any of the other devices/nodes in network 100, or may be directly connected to any of the other devices/nodes in network 100.

Figure 2:
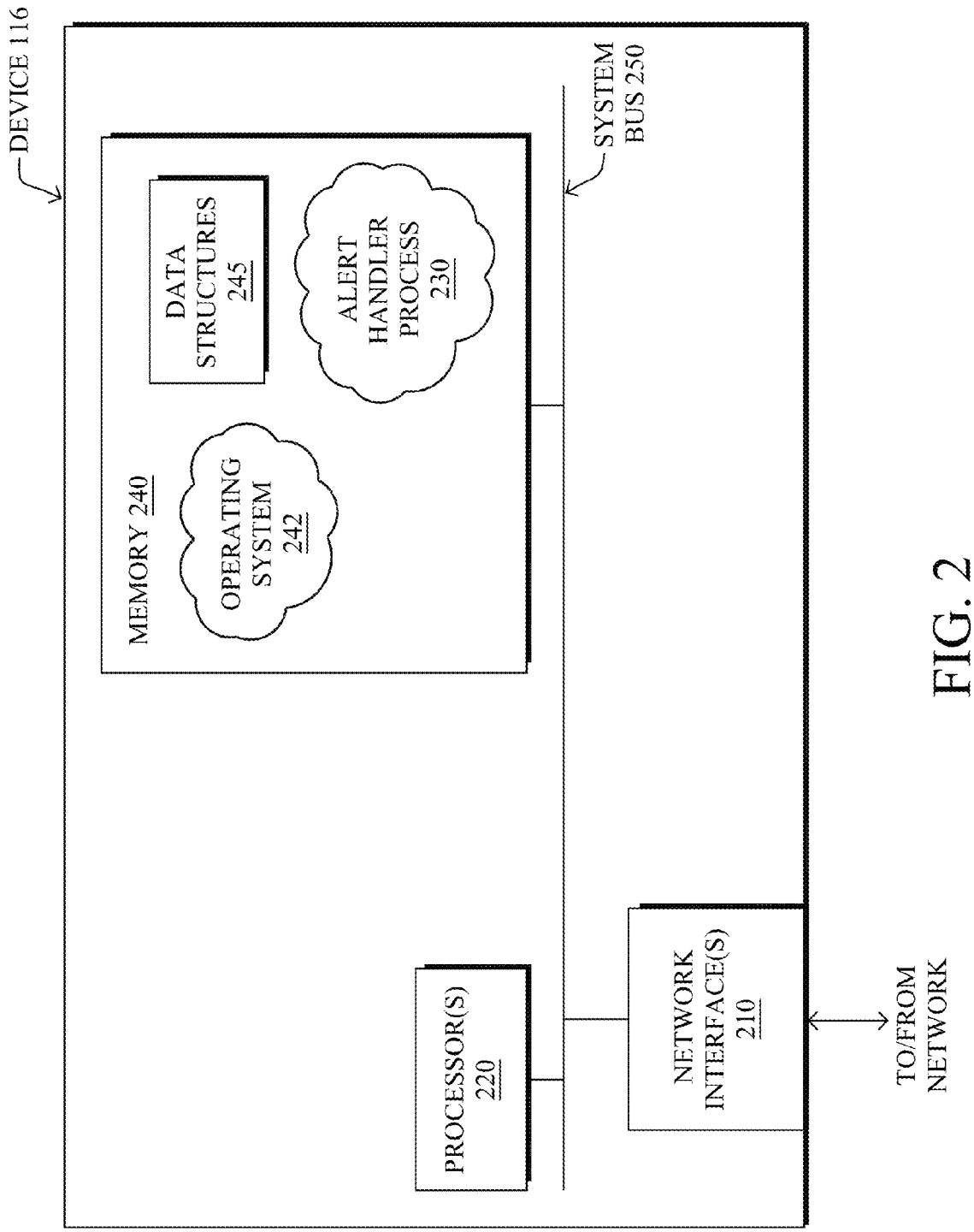
FIG. 2 illustrates an example network monitoring device.

FIG. 2 is a schematic block diagram of an example monitoring device 116 that may be used with one or more embodiments described herein, e.g., as shown in FIG. 1 above. The device may comprise one or more network interfaces 210 (e.g., wired, wireless, PLC, etc.), at least one processor 220, and a memory 240 interconnected by a system bus 250.

The network interface(s) 210 contain the mechanical, electrical, and signaling circuitry for communicating data over the network 100 and/or for receiving alerts from any of the devices in network 100. The network interfaces may be configured to transmit and/or receive data using a variety of different communication protocols. Note, further, that the monitoring device 116 may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services also comprise an alert handler process 230, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Alert handler process 230 contains computer executable instructions executed by the processor 220 to perform alert handling as will be understood by those skilled in the art. These functions may include, in various embodiments, the storage, analysis, and/or reporting of network alerts. For example, alert handler process 230 may analyze received network alerts 120 as shown in FIG. 1, identify a network alert pattern, and provide a notification of the network alert pattern to a user interface (UI).

As noted above, one of the main challenges in administering a network of devices, therefore, is to rapidly determine the root cause of a set of related alerts, so that corrective measures can be taken. Most existing approaches to identify the root cause of a network alert utilize pattern recognition to group together alerts that often appear together. For example, an apriori algorithm may be used to determine associations between different alerts. In general, these types of approaches use a breadth-first search to find a pattern of length k from item sets of length k−1. However, these approaches are typically unsuitable for many network applications, which often require real-time alert processing. Other attempts have focused on the use of frequent pattern trees, which reduce the number of database scans over apriori approaches. However, frequent pattern trees can grow to be quite large, thereby slowing down the process. Further attempts have focused on attempting to find sets of related alerts by approximating pattern results. In a networking environment, however, the exact set of frequent patterns from a data stream is often needed.

Adaptive Vertical Format Mining with Overlapping Transactions

The techniques herein may be used to identify network alert patterns, thereby enabling identification of the root cause of a set of network alerts. In particular, a real-time, frequent mining technique for discovering associated patterns in a continuous stream of incoming network alerts is disclosed. The technique proceeds mainly in two stages, in some embodiments. The first stage generates transactions (a set of logically related alerts) from the incoming alert stream. In the second stage, these generated transactions are provided as input to the adaptive vertical format mining technique, which discovers frequent occurring patterns using a newly defined adaptive approach.

In order to deal with unnecessary alerts or multiple alerts for the same root cause in the network alert data, overlapping transactions and adaptive pattern processing are used. Alert data already present in existing systems may be analyzed using the techniques described herein, meaning that no extra data collection overhead is imposed. The generation of overlapping transactions ensures that all the possible interesting patterns occurring in the data stream are included for processing. The pattern clustering and adaptive processing mechanism of the present technique also solves the time-complexity limitations of classical approaches, minimizing both the memory and time resource utilization.

Specifically, according to one or more embodiments of the disclosure, a plurality of network alerts is received at a device over a time frame. A sliding transaction window is used across the time frame to associate each network alert occurring within the transaction window with one or more transactions. A pruning test is applied to subsets of the plurality of network alerts, with the network alerts in a given subset being associated with the same transaction. The pruning test is based in part on the number of co-occurrences of network alerts in a given subset for different transaction windows. The subsets of network alerts are assigned to network alert clusters based on the applied pruning test. The network alerts are then joined within a network alert cluster to identify the largest grouping of network alerts that pass the pruning test. A notification that the identified grouping of network alerts is associated with the same transaction is also provided.

Illustratively, the techniques described herein may be performed by hardware, software, and/or firmware, such as in accordance with the alert handler process 230, which may contain computer executable instructions executed by the processor 220 to perform functions relating to the techniques described herein.

Figure 3B:
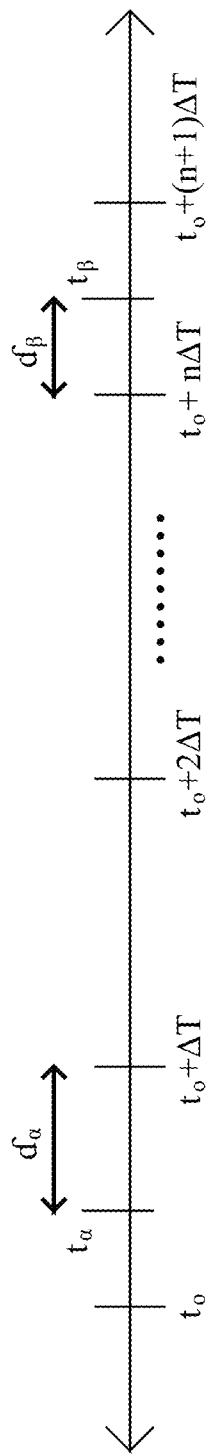
FIG. 3B illustrates a timeline over which network alerts occur.

Referring now to FIG. 3A, an example set of network alerts is shown, in one embodiment. As shown, various network alerts, such as network alerts 120 shown in FIG. 1, may be generated by the devices in a computing network over a time period, as shown in FIG. 3B, and stored within an alert database 300 (e.g., within the memory of monitoring device 116 or another networking node/device). Alert database 300 may include a first column 302 that designates the general type of the alert, such as whether the alert is critical or informational in nature. Alert database 300 may also include a column 304 that stores a unique identifier for each alert. In column 306, alert database 300 stores a unique device identifier for the network device that raised the alert. For example, IP addresses, MAC addresses, or other such device identifiers may be stored in column 306. Alert database 300 may include a column 308 which identifies the name and/or description of the particular alert. In column 310, alert database 300 may store a timestamp for each alert corresponding to when the event occurred. In column 312, alert database 300 may store an indication as to whether or not a particular alert is active or has been cleared. As will be appreciated by those skilled in the art, alert database 300 is illustrative and that network alert data may be stored in multiple tables or in other data structures, may include different columns of data than those depicted, etc.

In various embodiments, the network alerts in database 300 may be raised for a device by one of two mechanisms: polling or feedback. In polling, each device is polled (e.g., by a network monitoring device, such as network monitoring device 116) at regular intervals (e.g., ranging from 1 to $P_{max}$ seconds, minutes, etc.) and checked for changes in their status data. If the data obtained is found to be contradictory to the normal state of the device, a corresponding network alert is raised. If a feedback mechanism is used instead of a polling mechanism, a network device generates an alert by itself and forwards it to the managing device immediately (i.e., without the device first receiving a polling request from the network monitoring device).

Figure 4:
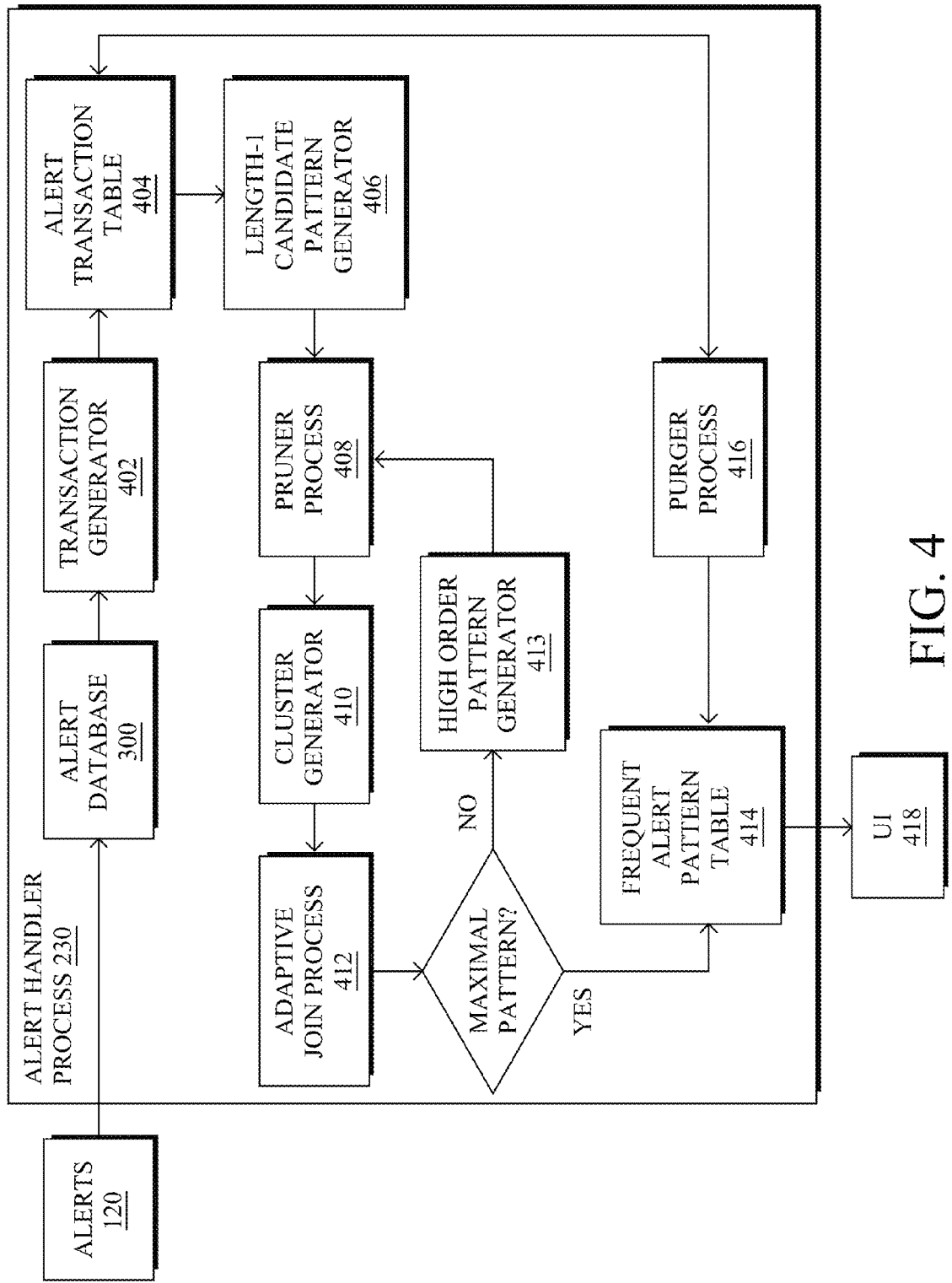
FIG. 4 illustrates the alert handler process of FIG. 2 in greater detail.

According to various embodiments, an alert handler process, such as alert handler process 230 shown in FIG. 2, may process alert database 300 to identify frequent patterns of network alerts. For example, FIG. 4 depicts one implementation of alert handler process 230. In various embodiments, alert handler process 230 performs one or more of: generating transactions using a transaction generator 402, updating an alert-transaction table 404, and adaptively processing entries in alert-transaction table 404 to identify frequent patterns of network alerts using a pruner process 408, cluster generator 410, and adaptive join process 412.

As noted above, polling may be used to obtain the network alerts 120 stored in alert database 300. In such a case, if a given network problem affects the functionalities for a number of network devices, the corresponding network alerts may be received from the affected devices within a maximum polling interval ($P_{max}$). Thus, any two alerts separated by an interval less than $P_{max}$ may be treated as being related by alert handler process 230.

In one embodiment, transaction generator 402 analyzes network alerts in alert database 300 to generate transactions stored in alert-transaction table 404. For example, transaction generator 402 may analyze the timestamps of the respective network alert entries in alert database 300, to associate the alerts with transactions. In general, any two alerts separated by an interval less than $P_{max}$ may be associated with the same transaction by transaction generator 402. In other words, given two events/alerts $\alpha$ and $\beta$, and their respective times of occurrence $t_\alpha$ and $t_\beta$ ($t_\beta > t_\alpha$), the following relationship may be used:

$$\forall (\alpha,\beta) \in A, \; \alpha \sim \beta | t_\beta - t_\alpha < P_{max}$$

where ~ denotes the relation "might be related to" and A is the set of all incoming network alerts within a polling interval. A representative timeline for the occurrence of events/alerts is depicted in the example of FIG. 3B. To ensure that each and every alert in a data stream of network alerts satisfies the above equation, transaction generator 402 may continuously slide the transaction window by an incremental amount ($\Delta T$) and create new transactions by storing the alerts within that window period ($T_{win}$), according to various embodiments. In one embodiment, transaction generator 402 may generate a new transaction in alert-transaction table 404 only if the incoming set of network alerts contains a new alert as compared to the previous transaction. Thus, if the first transaction in alert transaction table 404 contains network alerts occurring between time $t_0$ and time $t_0 + T_{win}$, the second one will contain the alerts from time $t_0 + \Delta T$ to time $t_0 + T_{win} + \Delta T$ and so on. Since the same network alert can be a part of multiple transactions, these types of transactions are referred to herein as "overlapping transactions."

The transaction window $T_{win}$ and the differential time $\Delta T$ by which the transaction window is incremented by transaction generator 402 may be determined as described below. Assume, for example, that the following holds true:

$$t_\beta - t_\alpha = P_{max}$$

To accommodate both alerts within the same transaction, the transaction window $T_{win}$ used by transaction generator 402 should be:

$$T_{win} = t_0 + (n+1)\Delta T - t_0 = (n+1)\Delta T$$

where n is an integer value (i.e., the timeline of network alerts span from time $t_0$ to a time $t_0 + (n+1)\Delta T$. Two values $\delta_\alpha$ and $\delta_\beta$ may be defined using the above equation such that:

$$t_\alpha + \delta_\alpha = t_0 + \Delta T, \; 0 < \delta_\alpha < \Delta T$$

and $$t_\beta - \delta_\beta = t_0 + n\Delta T, \; 0 < \delta_\beta < \Delta T$$

This gives the following:

$$t_\beta - t_\alpha = P_{max} = \delta_\beta + (t_0 + n\Delta T) - (t_0 + \Delta T) + \delta_\alpha$$

$$P_{max} = (n-1)\Delta T + \delta_\beta + \delta_\alpha$$

Since $P_{max}$ must be an integral multiple of AT, this means that $\delta_\beta + \delta_\alpha$ must also be a multiple of AT. Adding the inequalities in the definitions of $\delta_\alpha$ and $\delta_\beta$ gives the following:

$$0 < \delta_\alpha + \delta_\beta \leq 2\Delta T$$

This implies that $\delta_\alpha + \delta_\beta = \Delta T$. Using this relationship in the above definition of $P_{max}$ gives the following:

$$P_{max} = (n-1)\Delta T + \Delta T = n\Delta T$$

Similarly, the relationship $\delta_\alpha + \delta_\beta = \Delta T$ may also be used in the above definition of $T_{win}$ as follows:

$$T_{win} = (n+1)\Delta T = n\Delta T + \Delta T$$

$$T_{win} = P_{max} + \Delta T$$

Thus, in one embodiment, transaction generator 402 uses a transaction window $T_{win}$ that is the sum of the maximum polling interval $P_{max}$ and the incremental time AT to include network alerts in one transaction within alert-transaction table 404. For example, if $P_{max}$ used by transaction generator 402 is five minutes, AT may be one minute, giving a total transaction window $T_{win}$ used by transaction generator 402 of six minutes.

In one example of the possible operations of transaction generator 402, consider the following series of network alerts:

TABLE 1

| Time in Minutes Relative to $t_0$ | Alert |
|---|---|
| 0.5 | $b^1$ |
| 1.5 | $a^1$ |
| 3.5 | $c^1$ |
| 4.5 | $d^1$ |
| 5.5 | $b^2$ |
| 7.5 | $g^1$ |
| 9.0 | $a^2$ |
| 9.5 | $f^1$ |
| 10 | $e^1$ |
| 10.5 | $c^2$ |
| 13.5 | $f^2$ |
| 15.5 | $a^3$ |

In Table 1 above, network alerts are denoted by alphabetical letters with the superscript denoting their occurrence number. For example, $a^1$ denotes a first occurrence of network alert 'a' and $a^2$ denotes the second occurrence of alert 'a.' Using a transaction window of six minutes with a maximum polling interval of five minutes and an incremental time of one minute, the first transaction generated by transaction generator 402 will contain the alerts from 0-6 minutes (i.e., $b^1$, $a^1$, $c^1$, $d^1$, and $b^2$) Since there are no new alerts for the transaction window of 1-7 minutes, the second transaction generated by transaction generator 402 will contain the alerts from 2-8 minutes (i.e., $c^1$, $d^1$, $b^2$, and $g^1$). Of note is that some alerts having polling intervals less than $P_{max}$ (i.e., less than five minutes in the present example) may be associated with multiple transactions. For example, alerts $c^1$, $d^1$, and $b^2$ may each be associated with the first and second transactions generated by transaction generator 402.

In one embodiment, transaction generator 402 may divide a transaction in alert-transaction table 404 in such a way that each sub-transaction contains unique network alerts. For example, transaction generator 402 may divide a transaction $T = \{a^1, b^1, b^2, c^1, d^1, d^2, d^3, e^1\}$ into three sub-transactions containing unique alerts as follows:

$$T_1 = \{a^1, b^1, c^1, d^1, e^1\}$$

$$T_2 = \{a^1, b^2, c^1, d^2, e^1\}$$

$$T_3 = \{a^1, b^2, c^1, d^3, e^1\}$$

In doing so, the total number of sub-transactions generated by transaction generator 402 is equal to the maximum number of repetitions of any alert in the original transaction. Using the example data shown above in Table 1, the overlapping transactions generated in this manner are as follows:

TABLE 2

| Transaction ID | Start-End Time in Minutes | Grouped Alerts |
|---|---|---|
| $T_1$ | 0-6 | $b^1, a^1, c^1, d^1$ |
| $T_2$ | 0-6 | $a^1, c^1, d^1, b^2$ |
| $T_3$ | 2-8 | $c^1, d^1, b^2, g^1$ |
| $T_4$ | 4-10 | $d^1, b^2, g^1, a^2, f^1$ |
| $T_5$ | 5-11 | $b^2, g^1, a^2, f^1, e^1, c^2$ |
| $T_6$ | 8-14 | $a^2, f^1, e^1, c^2$ |
| $T_7$ | 8-14 | $a^2, e^1, c^2, f^2$ |
| $T_8$ | 10-16 | $e^1, c^2, f^2, a^3$ |

Thus, two sub-transactions/subsets of alerts occurring in the first transaction window may be created by transaction generator 402, since alert 'b' occurs twice within the transaction window. The resulting values may then be stored by transaction generator 402 in alert-transaction table 404 for further processing by alert handler process 230.

In one embodiment, transaction generator 402 stores transactions in a vertical data format in alert-transaction table 404. In other words, transaction generator 402 may store data as {alert:transaction} entries, instead of as {transaction:alert} entries. Doing so helps to provide fast and efficient processing of candidate patterns, especially in situations in which there are overlapping transactions. Transaction entries may also be paired by transaction generator 402 with the respective occurrence times of alerts. Thus, in one example, alert-transaction table 404 may appear as follows:

TABLE 3

| Alert | {Transaction:Occurrence Time} |
|---|---|
| a | $\{T_1:t_a^1\}, \{T_2:t_a^1\}, \{T_4:t_a^2\}, \{T_5:t_a^2\}, \{T_6:t_a^2\}, \{T_7:t_a^2\}, \{T_8:t_a^3\}$ |
| b | $\{T_1:t_b^1\}, \{T_2:t_b^2\}, \{T_3:t_b^2\}, \{T_4:t_b^2\}, \{T_5:t_b^2\}$ |
| c | $\{T_1:t_c^1\}, \{T_2:t_c^1\}, \{T_3:t_c^1\}, \{T_5:t_c^2\}, \{T_6:t_c^2\}, \{T_7:t_c^2\}, \{T_8:t_c^2\}$ |
| d | $\{T_1:t_d^1\}, \{T_2:t_d^1\}, \{T_3:t_d^1\}, \{T_4:t_d^1\}$ |
| e | $\{T_5:t_e^1\}, \{T_6:t_e^1\}, \{T_7:t_e^1\}, \{T_8:t_e^1\}$ |
| f | $\{T_4:t_f^1\}, \{T_5:t_f^1\}, \{T_6:t_f^1\}, \{T_7:t_f^2\}, \{T_8:t_f^2\}$ |
| g | $\{T_3:t_g^1\}, \{T_4:t_g^1\}, \{T_5:t_g^1\}$ |

The processing of alert-data by alert handler process 230 may, in some cases, be a continuous job occurring after a regular interval of time. In one embodiment, the processing interval may be user controlled and can vary from a few minutes to a few hours. Typically, the processing interval for alert handler process 230 should be equal to the maximum polling interval ($P_{max}$) for optimal performance of the system. However, other processing intervals may be used, in alternate embodiments.

Alert handler process 230 may include a length-1 candidate pattern generator 406 configured to form candidate alert patterns from alert-transaction table 404 each having one alert. In some cases, further processing by alert handler process 230 may include higher length candidate pattern generation and infrequent pattern pruning carried out by a pruner process 408, a cluster generator 410, and an adaptive join process 412. These three modules operate together to form the maximal frequent patterns using the alerts extracted by transaction generator 402 in a given processing cycle. For example, pruner process 408 may process the length-1 candidate patterns from length-1 candidate pattern generator 406, to begin the process. Pruner process 408, cluster generator 410, adaptive join process 412, and higher-order pattern generator 413 may then operate in an iterative manner to evaluate higher length candidate patterns until the maximal frequent patterns are identified.

Pruner process 408 is configured to "prune" (i.e., discard) candidate patterns based on one or both of the following conditions: a) if the frequency count of the pattern is less than a count threshold, or b) if the minimum confidence of the pattern is less than a confidence threshold. Generally, the frequency count denotes the total number of occurrence of the pattern in alert-transaction table 404, whereas a confidence value is a statistical measure that defines how often the alerts of a pattern occur together.

The operations of length-1 candidate pattern generator 406 and pruner process 408 may be as follows: for each alert of a candidate pattern, the set of transactions in which it has occurred is first obtained from alert-transaction table 404. These sets are intersected with each other to separate out the transactions that contain the given candidate pattern. Their count alone will not provide the pattern frequency count assessed by pruner process 408, as some of the alerts might be a part of multiple transactions. Thus, in one embodiment, pruner process 408 may utilize transaction compression based on the occurrence times associated with the alerts. In other words, transactions having the same occurrence time for any one of the alerts are counted as a single instance of the pattern by pruner process 408. The overall count using this transaction compression technique gives the total frequency count of the candidate pattern.

Continuing the above example with reference to Table 3, pruner process 408 may perform a frequency count for the candidate pattern {a, b, c} as follows:

Transactions containing alert 'a': $A=\{T_1,T_2,T_4,T_5,T_6,T_7,T_8\}$

Transactions containing alert 'b': $B=\{T_1,T_2,T_3,T_4,T_5\}$

Transactions containing alert 'c': $C=\{T_1,T_2,T_3,T_5,T_6,T_7,T_8\}$

Therefore, the transactions containing the candidate pattern {a, b, c} are $A \cap B \cap C=\{T_1, T_2, T_5\}$. Pruner process 408 may then look to the timing of each of alerts 'a', 'b,' and 'c,' to determine the frequency count. For example, pruner process 408 may evaluate the occurrences of the alerts from Table 3 above as follows:

TABLE 4

| Alert | $T_1$ | $T_2$ | $T_5$ |
|---|---|---|---|
| a | $t_a^1$ | $t_a^1$ | $t_a^2$ |
| b | $t_b^1$ | $t_b^2$ | $t_b^2$ |
| c | $t_c^1$ | $t_c^1$ | $t_c^2$ |

As shown in Table 4 above, the same occurrences of alerts 'a' and 'c' appear in transactions T1 and T2, representing a single instance of pattern. However, new occurrences of 'a', 'b,' and 'c' appear in transactions T1 and T5. In such a case, pruning process 408 may determine that the candidate patterns {a, b, c} has a frequency count of 2.

As a separate calculation from the frequency count, pruner process 408 may also determine a confidence measure, to represent the togetherness factor for alerts in a given pattern. In one embodiment, pruner process 408 calculates the confidence value as follows:

Confidence($A => B$)=$P(B|A)$=frequency_count($A \cup B$)/frequency_count($A$)

Pruner process 408 may skip this calculation for length-1 candidate patterns, as these types of patterns cannot be divided into two non-zero alert-subsets. For a given candidate pattern P, the confidence value ($A=>B$) is calculated for all the non-zero alert-subsets A, B such that $\{A \cup B\}=P$ and $\{A \cap B\}=\Phi$. The minimum among these is then checked against a confidence threshold by pruner process 408. If any subset pair is found having a lesser value than the confidence threshold, this indicates that the chances of the subsets occurring together are considerably less and, consequently, the given candidate pattern does not contain related network alerts. In such a case, pruner process 408 may discard the candidate pattern from further processing.

Cluster generator 410 is configured to divide lists of alerts into local clusters of related alerts that can be processed independently and in parallel. In general, the list of network alerts obtained for a given processing cycle may contain a mixture of patterns. There may also be mutually exclusive sets of related alerts in the same list. If pattern-processing is to be carried for the list as a whole, a considerable amount of time and resources would be wasted processing the unrelated alerts. To avoid this, cluster generator 410 divides the list of alerts for length-2 and higher candidate patterns into clusters (i.e., cluster generator 410 may be bypassed in the first round of processing).

Starting from the length-2 sets of candidate patterns identified after the first round of processing by processes 408-412, each of the length-2 candidate patterns undergoes the pruning tests discussed above with respect to pruner process 408. A candidate pattern that passes the tests is then assigned to a cluster by cluster generator 410. If a cluster already exists containing any one alert of the given pattern, the whole pattern is grouped to that cluster by cluster generator 410. Otherwise, a new cluster is created by cluster generator 410 to store the pattern.

In one example of the operation of cluster generator 410, consider the following list of network alerts that are collected in a given processing cycle:

alert-list=$\{\alpha_1,\alpha_2,\alpha_3,\alpha_4,\beta_1,\beta_2,\beta_3,\gamma_1,\gamma_2,\delta\}$ Here, the alerts of the form $\alpha$, $\beta$, $\gamma$ and $\delta$ are totally unrelated to each other such that any of their pattern combinations have zero frequency counts. Therefore, the length-2 set of candidate patterns formed by pruner process 408 will be:

$L2_{CP}=\{(\alpha_1,\alpha_2),(\alpha_1,\alpha_3),(\alpha_1,\alpha_4),(\alpha_2,\alpha_3),(\alpha_2,\alpha_4),(\alpha_3,\alpha_4),(\beta_1,\beta_2),(\beta_1,\beta_3),(\beta_2,\beta_3),(\gamma_1,\gamma_2)\}$ This set of length-2 candidate patterns can then be divided by cluster generator 410 into the following related pattern clusters as follows:

$L2_{CP}^1=\{(\alpha_1,\alpha_2),(\alpha_1,\alpha_3),(\alpha_1,\alpha_4),(\alpha_2,\alpha_3),(\alpha_2,\alpha_4),(\alpha_3,\alpha_4)\}$ $L2_{CP}^2=\{(\beta_1,\beta_2),(\beta_1,\beta_3),(\beta_2,\beta_3)\}$ $L2_{CP}^3=\{(\gamma_1,\gamma_2)\}$ Each cluster may then be processed by alert handler process 230 independent to one another and/or in parallel. In a similar manner, cluster generator 410 and pruner process 408 may perform evaluations of higher length candidate patterns. Generally speaking, this reduces the effective size of the candidate patterns at each stage of analysis, allowing for faster and more efficient processing of the candidate patterns by alert handler process 230.

Adaptive join process 412 is configured to join candidate patterns across the clusters from cluster generator 410. In general, prior patterns analysis techniques attempting to generate maximal patterns fall into one of two categories: 1.) top-down approaches and 2.) bottom-up approaches. In top-down approaches (e.g., apriori-like techniques, etc.) processing starts with length-1 candidate patterns which are progressively joined to form higher length candidate-patterns. The processing stops only when no more higher-order patterns to be created are possible. This requires considerable time and resources, especially when all the alerts in the length-1 set are a part of the same pattern. Bottom-up approaches, in contrast, begin processing with the highest order candidate-pattern obtained by taking all the alerts into one pattern. If that pattern passes a prune test, the processing stops immediately, or else, lower order candidate-patterns are formed by removing one alert from the pattern. This process then continues until a maximal frequent pattern is obtained. If none of the alerts form any pattern, this approach will go all the way up to length-1 candidate-pattern, also utilizing considerable resources and time.

According to the novel techniques described herein, for the pattern group clusters generated by cluster generator 410, adaptive join process 412 generates a maximal length candidate-pattern that contains all the alerts in the cluster. If the candidate-pattern passes prune test from pruner process 408, it is assigned as a maximal frequent pattern by adaptive join process 412 and the processing stops for the given cluster. On the other hand if the candidate-pattern fails the prune test from pruner process 408, higher orders candidate-patterns are generated from the patterns already in the cluster by adaptive join process 412 higher order pattern generator 413 and undergo the complete process again. In other words, pruner process 408, cluster generator 410, and adaptive join process 412 and higher order pattern generator 413 operate to generate a maximal length candidate-pattern and test its frequency after every stage. Thus, alert handler process 230 is able to identify the maximal frequent pattern for cases in which a.) all of the alerts are part of a single pattern, and b.) none of the alerts are part of any pattern, without requiring significant processing and memory resources.

Continuing the example of the length-2 candidate patterns shown above, adaptive join process 412 evaluates the clusters generated by cluster generator 410. For this operation, in one embodiment, pseudocode for adaptive join process 412 is as follows:

$L2_{CP}^1 = \{(\alpha_1,\alpha_2),(\alpha_1,\alpha_3),(\alpha_1,\alpha_4),(\alpha_2,\alpha_3),(\alpha_2,\alpha_4),(\alpha_3,\alpha_4)\}$ Maximal $CP^1 = \{(\alpha_1,\alpha_2,\alpha_3,\alpha_4)\}$ If (prune test($CP^1$)==pass)

Maximal frequent pattern=$CP^1$

End the process and store $CP^1$ in frequent alert pattern table 414

Else

Calculate $L3CP^1$ and repeat pruning, clustering, and adaptive join steps

Thus, pruner process 408, cluster generator 410, adaptive join process 412, and higher order pattern generator 413 operate in an iterative manner until a maximal-length, frequent candidate pattern is detected. Such a pattern may then be stored by alert handler process 230 in frequent alert patterns table 414.

In one embodiment, alert handler process 230 includes a purger process 416 that purges aging patterns to prevent alert-transaction table 404 from growing. In addition, if the old patterns are only infrequently purged, they may not be of interest to a user. Conversely, if the old patterns are purged too frequently, there may be many more instances of that pattern still in alert-transaction table 404. Thus, purger process 416 may utilize a purging threshold time to determine whether a pattern should be removed from frequent alert patterns table 414. In one example, purger process 416 may operate on a daily basis for a purging threshold of 2-3 months. All alerts and their associated transactions outside of this threshold may then be deleted from alert-transaction table 404 by purger process 416. In one embodiment, a frequent pattern may be stored in frequent alert patterns table 414 with a timestamp of the last modification time of the pattern. If the timestamp is outside of the purging threshold, purger process 416 may remove the pattern from frequent alert patterns table 414.

Figure 5:
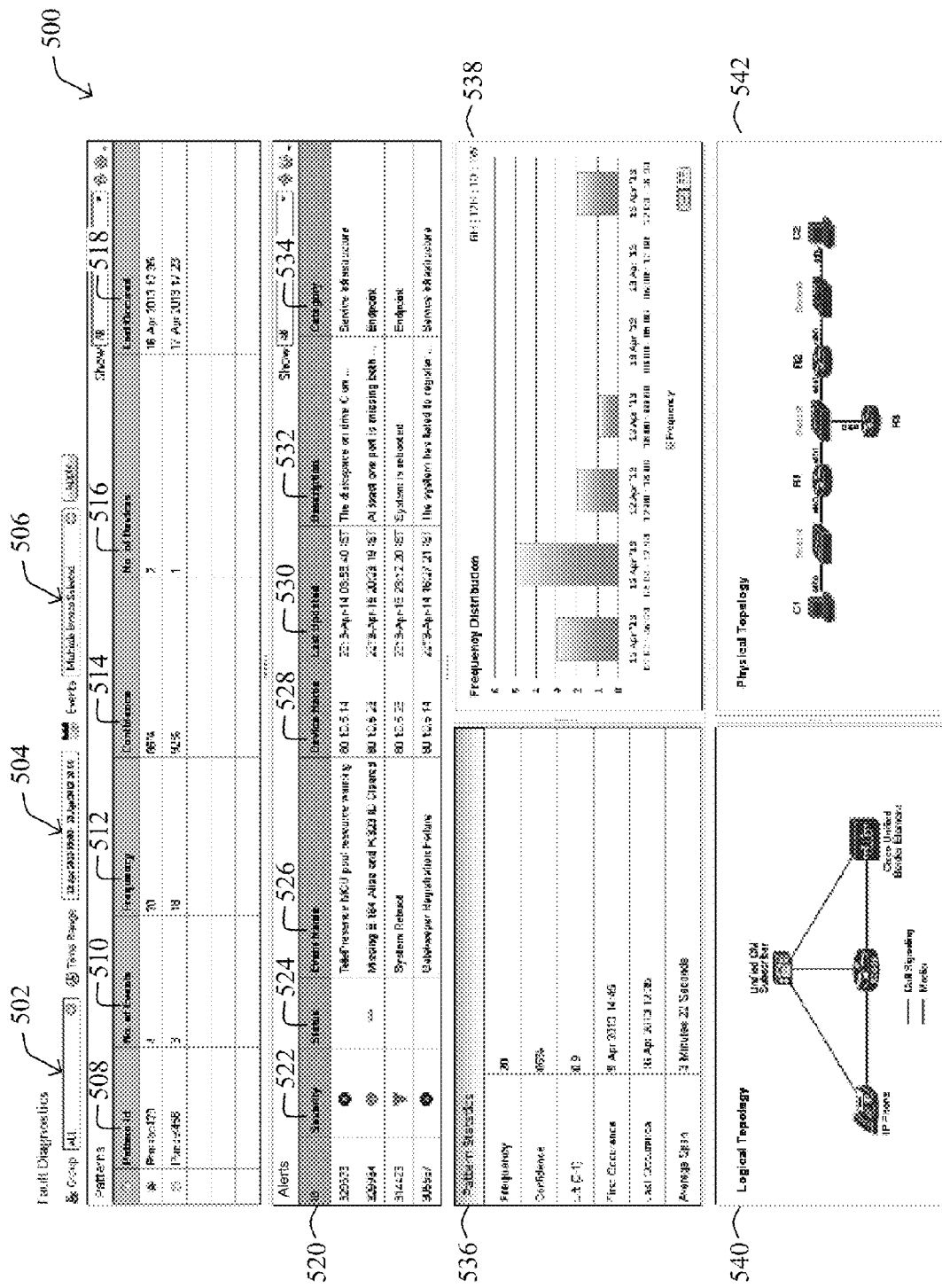
FIG. 5 illustrates a user interface showing network alert patterns.

In various embodiments, a maximal-length, frequent alert pattern in frequent alert patterns table 414 may be used to generate a notification provided to another computing device and/or to a user interface (UI) 418. For example, FIG. 5 depicts one example of a UI 500 showing frequent alert patterns. As shown, UI 500 may be part of a network monitoring and management application that provides visual data to a display for review by a user. For example, a network administrator may utilize UI 500 to review network alerts, statistics regarding the alerts, and/or detected patterns in the network alerts.

UI 500 may include various input fields 502-506 that allow a user to specify the focus group of network devices, time frame, and events/alerts, respectively. Based on the inputs to fields 502-506 specified by the user, the corresponding alerts are retrieved and displayed. For example, the network alerts occurring between Apr. 12, 2013 at time 0:00 and Apr. 13, 2013 at time 18:00 may be presented in a table containing columns 520-534. Columns 520-534 may display data such as the alert ID, level of severity, current status, name, device, timestamp, description, or category, respectively. Other information regarding each alert and/or different combinations of information can be displayed, in various other embodiments.

UI 500 may also include one or more graphics that depict the topology of the network. For example, image 540 may depict the logical topology of the network while image 542 depicts the physical topology of the network. Images 540-542 allow the user to easily identify which network devices have generated the alerts presented on UI 500.

In various embodiments, UI 500 includes one or more frequent alert patterns identified from the network alerts. As shown, for example, UI 500 may include a table having columns 508-518 that provide information such as a unique pattern ID, the number of events/alerts in the pattern, the frequency of the pattern, the confidence value associated with the pattern, the number of networking devices that generated the alerts in the pattern, and/or the last occurrence of the pattern, respectively. Selection of a particular pattern on UI 500 may cause statistics 536 to be displayed. For example, selection of the pattern labeled "Ptrnabc123" may cause statistics 536 to display information regarding the frequency, confidence value, lift, first occurrence, last occurrence, average span, or the like, regarding the selected alert pattern. In some cases, UI 500 may also display a chart 538 that graphs the frequency distribution for the selected pattern.

Figure 6:
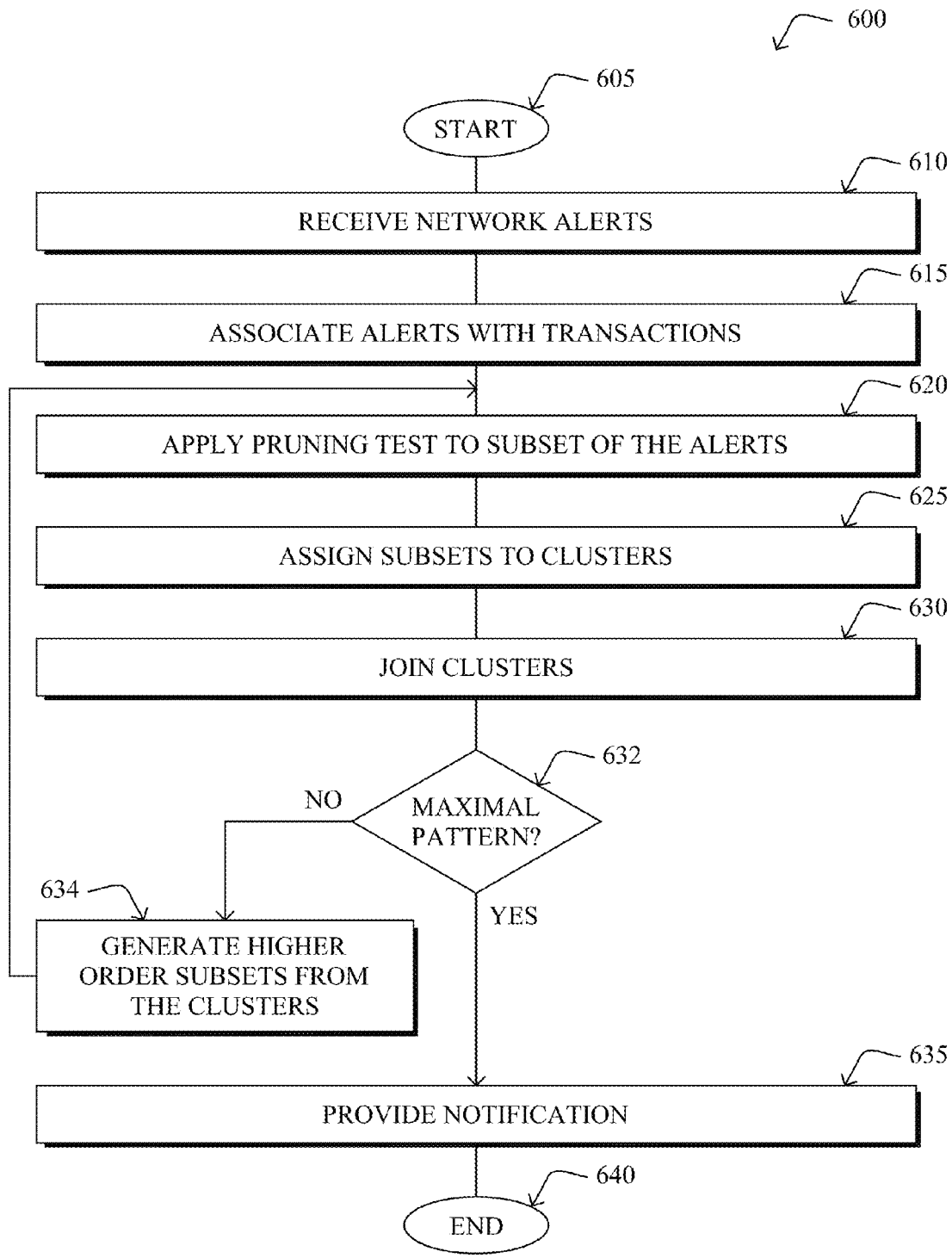
FIG. 6 illustrates an example simplified procedure for identifying a pattern of network alerts.

FIG. 6 illustrates an example simplified procedure for identifying a pattern of network alerts, in accordance with one or more embodiments described herein, e.g., generally from the perspective of the network monitoring device 116. The procedure 600 starts at step 605 and continues to step 610 where, as described in greater detail above, the network monitoring device may receive network alerts. In various embodiments, the network alerts are received over a given time frame, such as a polling window or other fixed amount of time for the alert collection. In step 615, each of the received network alerts is associated with one or more transactions. In some embodiments, as described above, a sliding transaction window may be used to group network alerts occurring within the transaction window into a single transaction. In step 620, a pruning test is applied to subsets of the alerts, as detailed in FIG. 7 below, to remove from consideration certain candidate patterns. Accordingly, in step 625, subsets of alerts are assigned to clusters, which may be processed independently and/or in parallel. In step 630, the clusters generated in step 625 are joined to form greater maximal length candidate patterns, to identify the largest group of alerts that passes the pruning test of step 620. In step 632, prune test is applied to the maximal length candidate pattern obtained from step 630. If it passes the prune test In step 635, a notification is provided regarding the largest identified grouping of alerts in step 635. For example, such a notification may be provided to another networking device or to display as part of a UI. On the other hand if it fails the prune test, higher order candidate patterns are generated in the step 634 which are fed as inputs to step 620. The simplified procedure 600 then ends at step 640.

Figure 7:
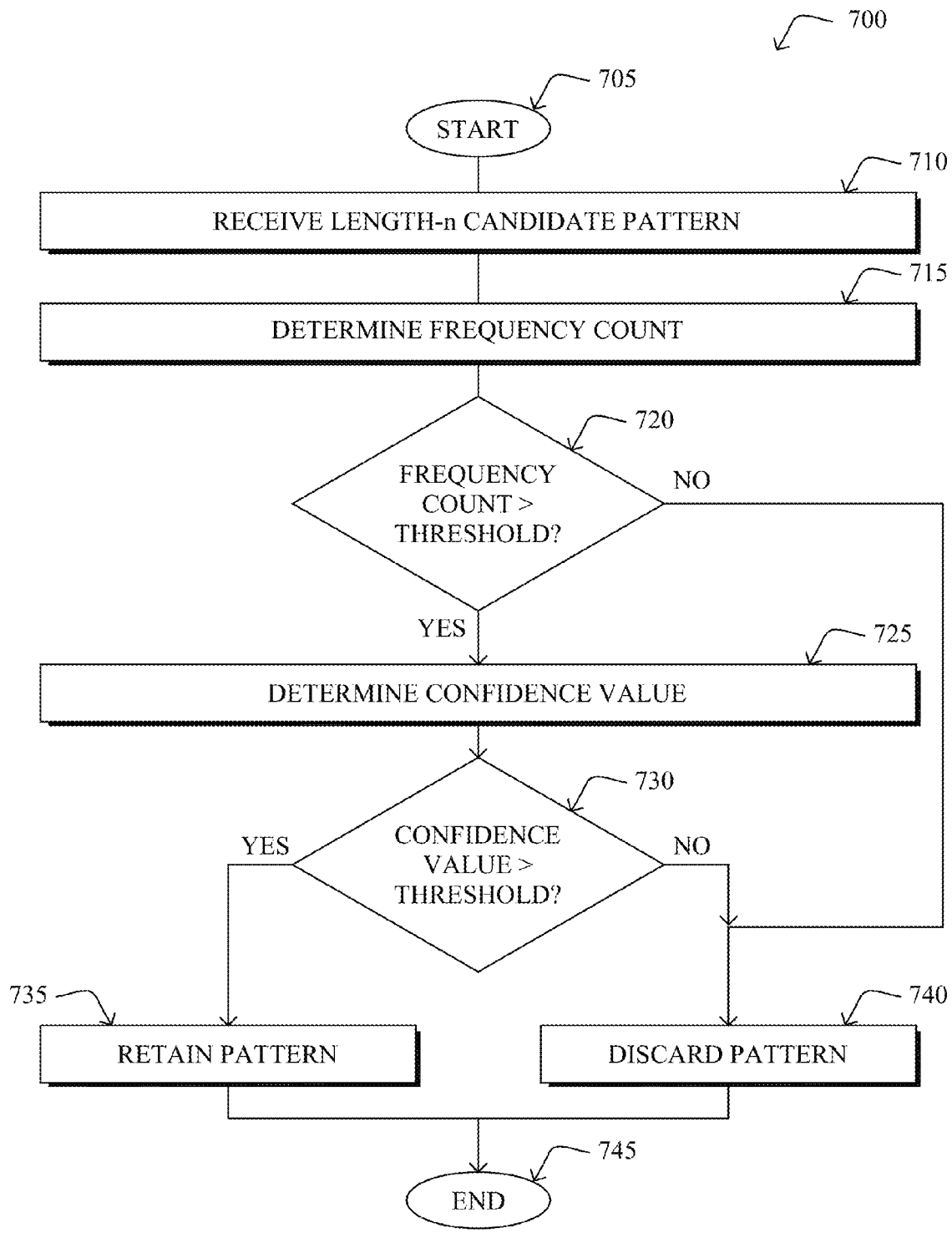
FIG. 7 illustrates an example simplified procedure to prune candidate patterns of network alerts.

FIG. 7 illustrates an example simplified procedure to prune candidate patterns of network alerts in accordance with one or more embodiments described herein, e.g., from the perspective of network monitoring device 116. The procedure 700 starts at step 705 and continues to step 710 where, as described in greater detail above, a length-n candidate pattern is received. In step 715, a frequency count is determined by identifying the number of times alerts co-occur for the transactions under analysis. At step 720, the frequency count is compared to a frequency count threshold. If the threshold is not exceeded, procedure 700 continues on to step 740 in which the candidate pattern is discarded from further consideration and ends at step 745. However, if the frequency count is greater than the frequency count threshold, procedure 700 continues on to step 725 in which a confidence value is determined. In general, the confidence value is a statistical measure of the probability of the occurrence of one alert subset if another alert subset has occurred. At step 730, a comparison is made between the confidence value and a confidence value threshold. If the confidence threshold is not exceeded, procedure 700 continues on to step 740 in which the candidate pattern is discarded and ends at step 745. However, if the confidence threshold is exceeded, procedure 700 continues to step 735 in which the candidate pattern is retained for further processing and ends at step 740.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for a method to calculate frequency counts for overlapping transactions that may be stored in a vertical format. In some aspects, the techniques described herein allow for overlapping transactions to be created from an incoming alert data stream. The techniques also provide for special case handling of alert repetition in a single transaction. In other aspects, the described techniques further provide for pattern group clustering to minimize the set sizes of candidate patterns. The techniques further allow for an adaptive joint process that differs from previous top-down and bottom-up approaches for pattern processing.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

receiving, at a device, a plurality of network alerts over a time frame;

using a sliding transaction window across the time frame to associate each network alert occurring within the transaction window with one or more transactions;

applying a pruning test to subsets of the plurality of network alerts, wherein network alerts in a given subset are associated with the same transaction, and wherein the pruning test is based in part on a number of co-occurrences of network alerts in the given subset for different transaction windows, wherein applying the pruning test includes:

determining whether the given subset of network alerts passes the pruning test by:

comparing the number of co-occurrences of network alerts in the subset for different transaction windows to a threshold value, and checking that the given subset has a minimum confidence value, the confidence value representing how often the network alerts in the subset occur together;

assigning the subsets of network alerts to network alert clusters based on the applied pruning test;

adaptively joining network alerts within a network alert cluster to identify the largest grouping of network alerts that pass the pruning test, wherein the network alerts are joined to form a larger maximal length candidate pattern that is then input to the pruning test; adaptive joining further includes:

identifying each unique network alert in a network alert cluster, forming a test group comprising the unique network alerts, applying the pruning test to the test group to identify
the largest grouping of network alerts that pass the
pruning test,
determining that the test group of unique network alerts
in the network alert cluster has failed the pruning
test,
using the unique network alerts to form new subsets of
network alerts, wherein the new subsets are of higher
order than the subsets assigned to the network alert
cluster;
assigning the new subsets to a new network alert
cluster, and
joining network alerts within the new network alert
cluster to identify the largest grouping of network
alerts that pass the pruning test;
associating a timestamp with the identified grouping of
network alerts associated with the same transaction;
deleting the identified grouping of network alerts if the
timestamp is greater than a purging threshold; and
providing a notification that the identified grouping of
network alerts is associated with the same transaction
by reducing the effective size of the candidate patterns
at each stage of analysis.

2. The method of claim 1, wherein an alert in the received plurality is associated with overlapping transactions.

3. The method of claim 1, further comprising:
determining that a subset of network alerts has passed the pruning test;
determining that an existing network alert cluster include one or more network alerts in the subset; and
assigning the network alerts in the subset to the existing network alert cluster.

4. The method of claim 1, further comprising:
determining that a subset of network alerts has passed the pruning test;
determining that none of the network alerts in the subset are included in an existing network alert cluster; and
generating a new network alert cluster that includes the subset.

5. An apparatus comprising:
one or more network interfaces configured to communicate in a computer network;
a processor configured to execute one or more processes; and
a memory configured to store a process executable by the processor, the process when executed operable to:
receive a plurality of network alerts over a time frame;
use a sliding transaction window across the time frame to associate each network alert occurring within the transaction window with one or more transactions;
apply a pruning test to subsets of the plurality of network alerts, wherein network alerts in a given subset are associated with the same transaction, and wherein the pruning test is based in part on a number of co-occurrences of network alerts in the given subset for different transaction windows, wherein applying the pruning test includes:
determining whether the given subset of network alerts passes the pruning test by:
comparing the number of co-occurrences of network alerts in the subset for different transaction windows to a threshold value, and
checking that the given subset has a minimum confidence value, the confidence value representing how often the network alerts in the subset occur together;
assign the subsets of network alerts to network alert clusters based on the applied pruning test;
adaptively join network alerts within a network alert cluster to identify the largest grouping of network alerts that pass the pruning test, wherein the network alerts are joined to form a larger maximal length candidate pattern that is then input to the pruning test; adaptive joining further includes:
identifying each unique network alert in a network alert cluster,
forming a test group comprising the unique network alerts,
applying the pruning test to the test group to identify the largest grouping of network alerts that pass the pruning test,
determining that the test group of unique network alerts in the network alert cluster has failed the pruning test,
using the unique network alerts to form new subsets of network alerts, wherein the new subsets are of higher order than the subsets assigned to the network alert cluster;
assigning the new subsets to a new network alert cluster, and
joining network alerts within the new network alert cluster to identify the largest grouping of network alerts that pass the pruning test;
associating a timestamp with the identified grouping of network alerts associated with the same transaction;
deleting the identified grouping of network alerts if the timestamp is greater than a purging threshold; and
provide a notification that the identified grouping of network alerts is associated with the same transaction by reducing the effective size of the candidate patterns at each stage of analysis.

6. The apparatus of claim 5, wherein the subsets of the plurality correspond to pairs of network alerts in the plurality.

7. The apparatus of claim 5, wherein the process is operable to:
determine that a subset of network alerts has passed the pruning test;
determine that an existing network alert cluster include one or more network alerts in the subset; and
assign the network alerts in the subset to the existing network alert cluster.

8. The apparatus of claim 5, wherein the process is operable to:
determine that a subset of network alerts has passed the pruning test;
determine that none of the network alerts in the subset are included in an existing network alert cluster; and
generate a new network alert cluster that includes the subset.

9. A tangible, non-transitory, computer-readable media having software encoded thereon, the software, when executed by a processor, operable to:
receive a plurality of network alerts over a time frame;
use a sliding transaction window across the time frame to associate each network alert occurring within the transaction window with one or more transactions;
apply a pruning test to subsets of the plurality of network alerts, wherein network alerts in a given subset are associated with the same transaction, and wherein the pruning test is based in part on a number of co-occurrences of network alerts in the given subset for different transaction windows, wherein applying the pruning test includes:
    determining whether the given subset of network alerts passes the pruning test by:
        comparing the number of co-occurrences of network alerts in the subset for different transaction windows to a threshold value, and
        checking that the given subset has a minimum confidence value, the confidence value representing how often the network alerts in the subset occur together;
assign the subsets of network alerts to network alert clusters based on the applied pruning test;
adaptively join network alerts within a network alert cluster to identify the largest grouping of network alerts that pass the pruning test, wherein the network alerts are joined to form a larger maximal length candidate pattern that is then input to the pruning test; adaptively joining further includes:
    identifying each unique network alert in a network alert cluster,
    forming a test group comprising the unique network alerts,
    applying the pruning test to the test group to identify the largest grouping of network alerts that pass the pruning test,
    determining that the test group of unique network alerts in the network alert cluster has failed the pruning test,
    using the unique network alerts to form new subsets of network alerts, wherein the new subsets are of higher order than the subsets assigned to the network alert cluster;
    assigning the new subsets to a new network alert cluster, and
    joining network alerts within the new network alert cluster to identify the largest grouping of network alerts that pass the pruning test;
        associating a timestamp with the identified grouping of network alerts associated with the same transaction;
    deleting the identified grouping of network alerts if the timestamp is greater than a purging threshold; and
provide a notification that the identified grouping of network alerts is associated with the same transaction by reducing the effective size of the candidate patterns at each stage of analysis.

\* \* \* \* \*

UNITED STATES PATENT AND TRADEMARK OFFICE
CERTIFICATE OF CORRECTION

PATENT NO. : 9,794,113 B2
APPLICATION NO. : 14/172110
DATED : October 17, 2017
INVENTOR(S) : Rajeev Ranjan et al.

Page 1 of 1

It is certified that error appears in the above-identified patent and that said Letters Patent is hereby corrected as shown below:

In the Specification

In Column 6, Line 42, please amend as shown:
The transaction window $T_{win}$ and the differential time $\Delta T$ In Column 7, Line 1, please amend as shown:
Since $P_{max}$ must be an integral multiple of $\Delta T$, this means In Column 7, Line 2, please amend as shown:
that $\delta\beta + \delta\alpha$ must also be a multiple of $\Delta T$. Adding the In Column 7, Line 19, please amend as shown:
polling interval $P_{max}$ and the incremental time $\Delta T$ to include In Column 7, Line 22, please amend as shown:
402 is five minutes, $\Delta T$ may be one minute, giving a total Signed and Sealed this
Eighth Day of December, 2020

Andrei Iancu
*Director of the United States Patent and Trademark Office*